(12) United States Patent
Zigdon et al.

(10) Patent No.: US 7,009,530 B2
(45) Date of Patent: Mar. 7, 2006

(54) MODULAR WIRELESS FIXED NETWORK FOR WIDE-AREA METERING DATA COLLECTION AND METER MODULE APPARATUS

(75) Inventors: Shimon Zigdon, Netanya (IL); Carmel Heth, Bar-Heffer (IL)

(73) Assignee: M&FC Holding, LLC, Raleigh, NC (US)

( * ) Notice: Subject to any disclaimer, the term of this patent is extended or adjusted under 35 U.S.C. 154(b) by 542 days.

(21) Appl. No.: 09/950,623

(22) Filed: Sep. 13, 2001

(65) Prior Publication Data

US 2003/0048199 A1 Mar. 13, 2003

(51) Int. Cl.
*H01R 12/16* (2006.01)
(52) U.S. Cl. .................. 340/870.02; 174/266; 361/785
(58) Field of Classification Search ................. 375/141, 375/298, 308; 174/266; 332/103, 100, 104; 361/785; 340/870.02, 870.01, 870.04, 825.02, 340/825.69
See application file for complete search history.

(56) References Cited

U.S. PATENT DOCUMENTS 6,005,883 A * 12/1999 Trompower .................. 375/141
6,369,336 B1 * 4/2002 Obata .......................... 174/266

* cited by examiner

*Primary Examiner*—Michael Horabik
*Assistant Examiner*—Hung Dang
(74) *Attorney, Agent, or Firm*—Bacon & Thomas

(57) ABSTRACT

A one-way direct sequence spread spectrum (DSSS) communications wide-area network is used as the data collection channel (uplink) of an automatic meter reading (AMR) application and a paging network, or other suitable downlink network, is used as an optional forward (downlink) channel in a cost-effective manner. The network is simple to deploy, highly scalable and modular. It offers a wide range of service options, from basic daily meter readings to advanced applications based on interval consumption data, to full two-way applications, while keeping the system's deployment and ongoing costs proportional to the service options and capacity requirements selected for various segments of the meter population. A high-output-power meter module is introduced, which provides significant benefits when operating on the network.

2 Claims, 11 Drawing Sheets

Sample times for Interval Consumption Data Air Message #1

Sample times for Interval Consumption Data Air Message #2

Sample times for Interval Consumption Data Air Message #3

(Typical prior art configuration)

| | | | | | | | | | | | | | | | | |
|---|---|---|---|---|---|---|---|---|---|---|---|---|---|---|---|---|
| 6-10 | 600 | 300 | 200 | 800 | 600 | 500 | 200 | 100 | 0 | 0 | 0 | 100 | 100 | 200 | 0 | 0 |
| 10-14 | 0 | 0 | 0 | 0 | 0 | 0 | 0 | 0 | 0 | 0 | 900 | 1100 | 800 | 800 | 800 | 700 |
| 14-18 | 700 | 700 | 1000 | 900 | 300 | 400 | 0 | 100 | 100 | 600 | 800 | 1100 | 1600 | 1800 | 1000 | 1200 |

Table 1:

| Two-Bit Code | Wh Consumption |
| --- | --- |
| 00 | 0 |
| 01 | 100 |
| 10 | 200 |
| 11 | 300 |

Table 2:

| Two-Bit Code | Wh Consumption |
| --- | --- |
| 00 | 0 |
| 01 | 100 |
| 10 | 300 |
| 11 | 600 |

Table 3:

| Two-Bit Code | Wh Consumption |
| --- | --- |
| 00 | 0 |
| 01 | 200 |
| 10 | 500 |
| 11 | 1000 |

Table 4:

| Two-Bit Code | Wh Consumption |
| --- | --- |
| 00 | 0 |
| 01 | 400 |
| 10 | 1000 |
| 11 | 1800 |

Figure 10

MODULAR WIRELESS FIXED NETWORK FOR WIDE-AREA METERING DATA COLLECTION AND METER MODULE APPARATUS

FIELD OF THE INVENTION

The present invention generally relates to wireless messaging systems and methods. In particular, the present invention relates to wireless messaging systems and methods for automated meter reading (AMR) and metering data collection.

BACKGROUND

Automated Meter Reading (AMR) started out as a more efficient and accurate method for utility metering data collection, compared to manual meter reading of electric, gas and water meters. Several important advantages of AMR over manual meter reading helped develop it into a specialized branch of the data communications and telemetry industry. Worth noting among these advantages are the reliability, accuracy and regular availability of metering data, collected from hard-to-reach meter locations as well as from standard meter locations; higher customer security (no need to enter homes) and satisfaction (accurate bills); and reduced cost of customer service call center and service house calls for settling billing disputes.

Various technologies are implemented in AMR. All implementations perform the tasks of interfacing the meter in order to sense consumption, communicating consumption data to a central site and storing consumption data in a computer system at the central site. Wireless technologies have become the most common in AMR system implementation due to the ease of the installation process and, in many cases, the low initial and operating costs of the system.

Among wireless implementations of AMR, a categorization has been established between mobile data collection systems and fixed-base data collection systems, or networks. Fixed network systems have some important distinctive advantages, brought about by the frequent (typically at least daily) consumption data collection, in comparison with mobile systems, which merely provide a more reliable method of collecting monthly meter reads for billing purposes. Worth noting among these advantages are: flexibility of billing date; marketing tools such as time-of-use (TOU) rates, demand analysis and load profiling, which enable clearer market segmentation and more accurate forecasts for utility resource generation, and also serve the goal of energy conservation and efficient consumption; and maintenance tools such as immediate notification of utility resource leakage or of account delinquency. These advantages have triggered increased interest and commercial activity regarding fixed network data collection systems for utilities, particularly utilities in regions undergoing deregulation of utility services.

Several methods and systems for implementing fixed-base data collection from a plurality of remote devices, such as utility meters, to a central location, have been developed and introduced in the past years. A categorization has evolved as the AMR industry developed, generally differentiating between one-way and two-way wireless data networks. Some systems, such as those described in U.S. Pat. No. 5,438,329 to Gastouniotis et al., U.S. Pat. No. 5,883,886 to Eaton et al. and U.S. Pat. No. 6,246,677 to Nap et al., require that each meter module on the network be a two-way module, i.e. contain a receiver circuit in the meter module.

Although two-way communication features such as on-demand meter reading and other remote commands for meter configuration and control are generally desirable, they may not be required for the entire meter population of a utility. Since the inclusion of a receiver in the meter module contributes significant cost to the module, it would be most desirable to allow a utility service company the flexibility to deploy an AMR network, which may contain and support both one-way and two-way meter modules.

U.S. Pat. No. 5,963,146 and U.S. Pat. No. 6,172,616 to Johnson et al., assigned to Itron, Inc. of Spokane, Wash. (referred to henceforth as the Itron network) and U.S. Pat. No. 6,163,276 to Irving et al. and U.S. Pat. No. 6,195,018 to Ragle et al. (referred to henceforth as the CellNet network) describe data collection networks that may also operate as one-way (collection only) data networks. These networks support the large volume of data, expected by advanced metering applications, by deploying intermediate data collection nodes (Remote Cell Nodes, or RCN's, in Itron's network and Microcell Controllers in CellNet's network), each of which creates a small data collection cell with a short-range RF link and a typical service population of several hundreds of meters. In these networks, the data collection nodes receive messages from meter modules, perform metering data analysis and extract, or generate, specific meter function values to be transmitted to the next level in the network hierarchy. The wide-area network connecting the intermediate level and the higher level is typically a wireless network operating on an additional, licensed, RF channel, in order to avoid interference. This configuration, which distributes the 'network intelligence' among many data collection nodes, serves the purpose of reducing the data flow into the central database when a large amount of meters is analyzed for load profile or interval consumption data. It also serves the purpose of reducing air-message traffic between the intermediate node and the higher-level concentrator node, referred to as IDT (Intermediate Data Terminal) in the Itron network and Cellmaster in the CellNet network.

However, the configuration of the Itron and CellNet networks becomes inefficient in the common case where only a part, or none, of the meter population requires advanced metering services like TOU rates, while basic daily metering service is required for the whole meter population. This inefficiency is imposed by the short-range radio link between the meters and the data collection nodes, which significantly limits the number of meters a node can serve, regardless of how many meters require or do not require to be read frequently for interval consumption data. That way, an expensive infrastructure of up to thousands of data collection nodes may be deployed, which may often consist of plenty of unused excess capacity. A more efficient network would therefore be desirable, in order to reduce basic equipment cost, as well as installation and ongoing maintenance costs.

In addition, because of the large number of data collection nodes, the most cost-efficient means for the WAN layer in these multi-tier networks would be a wireless WAN. However, to avoid interference from meter modules, as well as over-complication of the data protocols, a licensed frequency channel is typically used for the WAN, adding to the overall cost of services to the network operator. A network composed of only one wireless data collection layer would therefore be desirable, particularly if operating in the unlicensed Industrial, Scientific and Medical (ISM) band.

Yet another disadvantage of networks with distributed intelligence among the data collection nodes is the limited storage and processing power of the data collection nodes. A system that could efficiently transfer all the raw data from the meter modules to the network's central database would therefore be desirable, since it would allow for more backup and archiving options and also for more complex function calculations on the raw meter data.

The Itron patents also quote a previously developed system by Data Beam. This data collection network included few reception sites, each one capable of handling up to tens of thousands of meters. In order to allow for long communication range, the meter module antenna was installed in a separate (higher and/or out of building) location from the meter module, creating significant additional cost to the meter module installation, thus significantly reducing the commercial feasibility for practical deployment of the network. In addition, the meter module's power consumption requirements required a mains power source or expensive batteries, further reducing the network's commercial feasibility.

None of the above-mentioned systems of the prior art offers a sufficient level of flexibility, enabling the network operator to deploy a reliable, low cost, fixed data collection network, while adjusting its initial and ongoing costs to a wide range of application requirements, from basic daily meter reads to full two-way capabilities. Inefficiencies exist in each two-way network, in which the two-way capability is imposed on the entire meter population, and also in each one-way network, in which small cell configuration requires a large, unnecessary investment in infrastructure.

It is therefore desirable to introduce a simple to deploy, but highly scalable, modular and reliable data collection system, which would offer a wide range of service options, from basic metering to advanced applications based on interval consumption data, to full two-way applications, while keeping the system's deployment and ongoing costs proportional to the service options and capacity requirements selected for various segments of the meter population.

SUMMARY OF THE INVENTION

According to a particular embodiment of the present invention, a one-way direct sequence spread spectrum (DSSS) communications network is used as the data collection channel (uplink) of an automatic meter reading (AMR) application and a paging network, or other suitable downlink network, is used as an optional forward (downlink) channel in a cost-effective manner. The network is designed to provide a cost-effective wide-area data collection solution, i.e. capable of supporting as many meters on as large a geographical area as required by the associated metering application.

The communications network includes one-way meter modules (transmitters) communicatively coupled to electric, gas and water utility meters, as well as two-way meter modules (transceivers) coupled to such utility meters. The meter modules monitor, store, encode and periodically transmit metering data via radio signals (air messages), in an appropriate RF channel, typically within the 902–928 MHz Industrial, Scientific and Medical (ISM) band, allocated by the Federal Communications Commission (FCC) for unlicensed operation. Metering data messages are collected by a network of receiver Base Stations. The reception range of each Base Station is typically over 5 miles in urban areas, allowing sparse infrastructure deployment for a wide variety of metering data collection applications. The network also includes a Data Operations Center (DOC) that communicates with all the Base Stations, monitors their operation and collects metering data messages from them. The DOC may also be communicatively coupled to a paging network, or other wireless network, for sending downlink commands to the two-way meter modules.

This invention also features a low-cost, energy efficient meter module, which provides significant benefits to the system, primarily contributing to the long range of the wireless link, by implementing a direct sequence spread spectrum (DSSS) signal of high output power and high interference rejection, while consuming very low average power, thus enabling long life (many years) battery operation. The meter module's PCB antenna is an integral part of the module. The meter module is simple to install, and is typically installed inside electric meters, integrated (between meter and index) in gas meters, or as an external unit adjacent to water meters. The meter module also supports the unique configuration of the described system and limits the usage of air-time by introducing data compression mechanisms into the wireless link.

Main advantages of the invention include:

Long wireless communication link, which provides wide-area coverage with a small number of sites (typically tens of thousands of meters in a five-mile radius per Base Station), thereby simplifying network deployment, reducing infrastructure initial and ongoing costs, and reducing the number of potential failure points in the network, thus increasing reliability;

As a data collection network, the system may operate utilizing a single RF channel, such as a spread spectrum channel within the 902–928 MHz band.

Modularity of network architecture, enabling flexibility in network planning, in order to optimize cost and capacity in various regions covered by the network. A part of the network's modularity is that a forward channel, such as a paging network, can be integrated with the data collection channel, providing a convenient transition to supplying data services to both one-way and two-way meter modules.

Scalability mechanisms, enabling gradual and cost-efficient increase of infrastructure deployment in order to meet a wide range of application and capacity requirements, including requirement relating to interval consumption data applications;

Routing of all raw metering data to the DOC central database, where it can be easily processed, archived and accessed.

BRIEF DESCRIPTION OF THE DRAWINGS

The invention is herein described, by way of example only, with reference to the accompanying drawings, wherein:

FIG. 10 shows examples of logarithmic consumption data encoding tables.

DESCRIPTION OF THE PREFERRED EMBODIMENT

General

Figure 1:
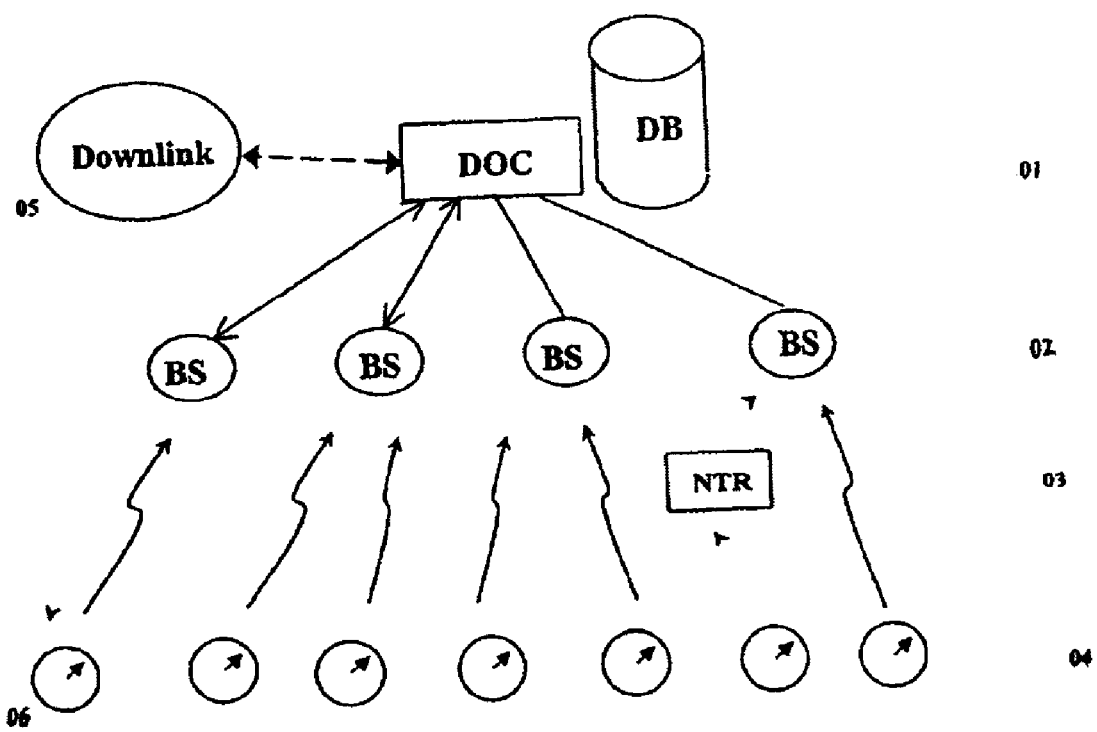
FIG. 1 is a block diagram illustrating required and optional components of the data collection network system, according to an embodiment of the present invention.

This invention features a scalable and modular wireless fixed-base data collection network system, comprising at least one wireless meter module, one receiver site (Base Station) and one central site (Data Operations Center) into which all metering data is collected.

According to a particular embodiment of the present invention, a one-way direct sequence spread spectrum (DSSS) communications network is used as the data collection channel (uplink) of an automatic meter reading (AMR) application and a paging network, or other suitable downlink network, is used as an optional forward (downlink) channel in a cost-effective manner. The network is designed to provide a cost-effective wide-area data collection solution, i.e. capable of supporting as many meters on as large a geographical area as required by the associated metering application.

The communications network includes one-way meter modules (transmitters) communicatively coupled to electric, gas and water utility meters, as well as two-way meter modules (transceivers) coupled to such utility meters. The meter modules monitor, store, encode and periodically transmit metering data via radio signals (air messages), in an appropriate RF channel, typically within the 902–928 MHz Industrial, Scientific and Medical (ISM) band, allocated by the Federal Communications Commission (FCC) for unlicensed operation. Metering data messages are collected by a network of receiver Base Stations. The reception range of each Base Station is typically over 5 miles in urban areas, allowing sparse infrastructure deployment for a wide variety of metering data collection applications. The network also includes a Data Operations Center (DOC) that communicates with all the Base Stations, monitors their operation and collects metering data messages from them. The DOC may also be communicatively coupled to a paging network, or other wireless network, for sending downlink commands to the two-way meter modules.

Since transceiver power consumption is greater than transmitter power consumption, it is generally preferable to use transmitters where the power source is limited. Gas and water meter modules generally have a limited power source, typically from a battery, so the meter modules attached to such meters are generally transmitters rather than transceivers. Electric meters can typically take their power from the electric grid, so their power is not limited, and hence transceivers are suitable for electric meters. However, because the cost of the transceiver meter module is greater than the cost of the transmitter meter module, electric meters may use a transmitter to save on the end unit cost. Thus, typically gas and water meters use transmitters only, while electric meters use transmitters or transceivers according to the application requirements. Transceivers are used to create a two-way system, which has the advantage of greater capacity than a one-way system, and which can provide additional services (such as remote connect or disconnect, over-the-air programming or reprogramming of meter module parameters, and others) that cannot be provided by a one-way system.

Basic Network Architecture and Configuration

A high-level block diagram of a metering data collection network system is depicted in FIG. 1. The system comprises both one-way (transmitter) meter modules 04 and two-way (transceiver) meter modules 06 coupled to meters. All meter modules are able to transmit encoded DSSS radio signals representing metering data stored in the meter modules, such as current meter reading, tamper status, meter identification data and interval consumption data. A variety of utility meter module types (electric, gas, water) and models may operate in one metering data collection network, utilizing the same infrastructure. Each receiver Base Station 02 is able to receive and decode DSSS encoded signals (air messages) generated by the meter modules. The bandwidth of the DSSS signal is approximately 2 MHz. Base Stations 02 can be optimized to receive signals in any radio frequency range between 800 MHz and 1 GHz, including the 902–928 MHz Industrial, Scientific, and Medical (ISM) band allocated by the FCC for unlicensed use. In a preferred embodiment, the data collection network operates in the ISM band under the rules for unlicensed operation (Part 15 of the FCC Rules), and requires no licensing for any portion of its wireless uplink channel.

According to the preferred embodiment, one or more Base Stations 02 would be deployed to cover a geographic area. The number of Base Stations 02 needed depends on the size and type of terrain within the geographic coverage area, as well as upon application requirements. A Base Station is typically installed at a high location (communication tower or roof top) and consists of the following components: at least one receiving antenna, RF cables and connectors, a DSSS receiver and a communication interface, such as a PPP router or CDPD modem. A Base Station may also contain a backup power source for continued operation during a specified period of outage. Base Stations 02 receive metering data air messages from meter modules 04 and 06 on the uplink channel. The Base Stations decode the radio signals and relay the decoded metering data air messages to the DOC 01. The DOC 01 is coupled to the Base Stations 02 via standard communication channels, typically by using an IP network (such as frame relay or Internet). Other communication means between the DOC and the Base Stations may be a wireless cellular network, CDPD, PSTN and satellite data network. The DOC 01 consists of a database of all the meter modules in the network and an Internet server for accessing the database. This embodiment also enables the DOC to provide alerts and event notification services via email, fax, pager devices and voice message generators. The DOC may be programmed to forward data directly to a user or to export files to a buffer directory by using standard data protocols.

According to the preferred embodiment, the DOC performs metering data validation, processing and storage, while the Base Stations' role is to decode air messages and forward raw metering data to the DOC for central processing. This structure eliminates the requirement to monitor and control metering data processing tasks carried out in multiple locations. All metering data is stored in a central location, enabling fast data access response times and equipped with suitable backup storage means. Thus two objectives are served: low initial and maintenance cost of Base Station hardware and software; and convenient, permanent access to all metering data collected by the network via one central data repository.

The DOC may be constructed, according to the application requirements, to operate in a High Availability (HA) configuration, that is two computer platforms having the capability to transfer all processing and communication tasks and parameters instantaneously from one to the other in the event of a failure of one of the platforms. In addition, the DOC may be configured, according to the application requirements, to communicate with a computer platform at a remote mirror site and periodically transfer the required data in order to maintain Disaster Recovery (DR) capability at the remote mirror site.

Network Architecture Modularity

The network's basic architecture includes transmitter meter modules, Base Stations and a DOC. However, the network is modular and may include message-repeating devices and, as stated, two-way meter modules and a downlink (forward) RF channel to communicate between the DOC and the two-way meter modules. In addition, as will be further described, the network includes a variety of scalability mechanisms enabling cost-effective service in varying levels of network air-message traffic and various metering data applications.

Network Transceiver/Repeater (NTR)

According to a particular embodiment, in some cases, a cost-efficient means for expanding network coverage is adding Network Transceiver/Repeater devices (NTR) in order to provide coverage for meter modules experiencing poor or no Base Station coverage. This means provides more flexibility to the network operator by creating another option for providing coverage to a limited geographic area. NTR cost of deployment and maintenance is significantly lower than that of a Base Station. Therefore, besides being a cost effective solution to poor coverage, it also may cost justify the enhancement of a network's coverage to areas of low population density, thus extending the reach of its automated metering data collection system. The deployment of NTR devices does not require the network operator to perform any changes in any of the other elements of the network infrastructure.

In the design of a network, there will be an analysis of expected radio traffic. Many areas will have sufficiently high radio traffic to cost-justify full Base Station coverage. However, there will be certain areas, or "holes", in which radio traffic will be very sparse, and cannot cost-justify Base Station coverage. NTRs may provide sufficient coverage at much lower cost. For example, a small number of meters in a deep valley may not be covered by the nearest Base Station, but do not economically justify the deployment of a Base Station. The NTR is smaller in size compared to a Base Station and may be mounted on a pole top, since it only needs to provide limited coverage. Therefore, its ongoing site lease cost is also significantly lower than that which an additional Base Station would create. The use of a NTR is thus a low-cost means of covering holes in the coverage of the Base Station network, or of extending the network's coverage to areas of low air-message traffic.

Network Transceiver/Repeater devices (NTR), shown as 03 in FIG. 1, receive metering data messages from meter models 04 and 06, decode and retransmit messages of specific meter modules. NTR devices 03 are used in specific terrains, which endure poor radio coverage, or in other events of lack of coverage or of coverage degradation in a certain area. The NTR is a low cost data collection node, with lower RF sensitivity and smaller coverage (hundreds of meters) compared to a Base Station. Like the Base Station, the NTR does not perform any metering data analysis. It only retransmits the raw data air messages that it receives and that are identified as received from appropriate meter modules listed in the NTR's memory.

The NTR 03 decodes the received air messages and then encodes and retransmits them only if the message has been received from a particular set of meter modules. Repeated messages may then be received by a Base Station 02. Each NTR 03 retains a list of some meter modules 04, 06 that reside in that area, and relays only messages received from those meter modules. In another embodiment, the NTR 03 checks for a NTR flag bit in the air message that indicates whether or not to relay the message. A combination of these two embodiments is applicable as well. These selective measures enable network coverage enhancement without creating an unnecessary load of air message traffic. The NTR's selectivity allows planning for specific meter modules to have their air messages repeated. Also, each meter module can be programmed to use its NTR flag in order to have only some of its air messages repeated, this way optimizing the increase in air message traffic.

Two-Way Network

Figure 2:
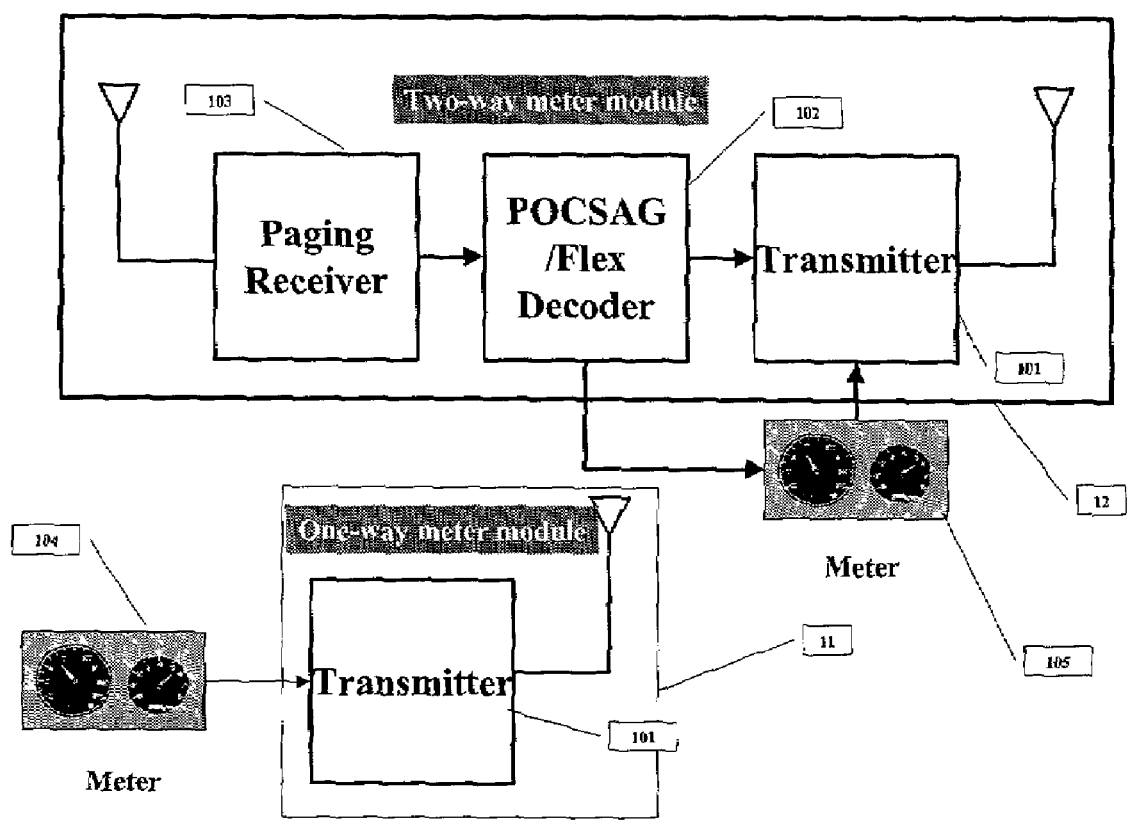
FIG. 2 is a block diagram illustrating a practical configuration of a two-way meter module.

A two-way meter module is capable of transmitting metering data air messages on demand (upon receiving an appropriate wireless command) and may also be conveniently programmed to transmit at specific times by maintaining a real-time clock synchronized by the wireless downlink channel. Two-way meter modules also receive, decode and execute other commands such as: programming meter parameters, displaying messages or alerts on the meter's display, disconnecting and reconnecting power to the utility meter's load. FIG. 2 depicts a block diagram of a particular embodiment of a two-way meter module, in which the elements added to a one-way meter module (transmitter described herein), in order to produce a two-way meter module, include a paging receiver and decoder. The basic transmitter apparatus is described further in detail separately below.

The DOC may be coupled to a wireless downlink channel, such as a paging network, cellular network, etc., 05 through a communication link, such as a leased line, frame relay link etc., and by using suitable standard data protocols. The metering data collection system operates as a one-way data collection system if not coupled to a downlink channel. The basic one-way network may be scaled up to several higher levels of capacity and application features, as described herein, the highest level being reached by integrating a downlink channel in the system.

Network Performance Scalability

One of the key features of the system claimed herein is the ability to ramp up the system's air message capacity. This feature is called "Network Performance Scalability". In a metering data collection application, various levels of message delivery probability or message redundancy may be required, as well as various data latency requirements, thus affecting the amount of messages transmitted per time period, i.e. air message capacity requirement. In addition, a trade-off exists between the amount of data required by the application and the maximum amount of air messages transmissions allowed, in order to maintain air message traffic or meter module battery life at acceptable levels. In the preferred embodiment, the network is designed so that the network operator or deployment planner has the flexibility to optimize space diversity, frequency diversity and air message duration according to the application requirements of delivered metering data, meter module battery life, metering data latency and air message delivery probability.

Following is a description of the levels of capacity that may be provided, depending upon customer demand. Note that levels 2 to 4 described herein may be implemented in any order.

Level 1: A sparse Base Station network is deployed, combined, if necessary, with NTR devices covering areas with very limited radio traffic. This level provides adequate geographic coverage, and the minimum level of system capacity. This level is roughly defined as the capacity required in order to provide daily reads to an urban meter population. A typical urban deployment for this level would include Base Stations spaced 5 miles apart, each covering up to several tens of thousands of meters, with few to no deployments of NTR devices.

Basic Network Control Parameters

Level 2: Space diversity is implemented to adjust network capacity, by controlling the amount of Base Stations used in order to provide coverage to specified meter population and metering data application in a specified geographical area. The initial phase of planning network coverage includes optimal selection of the number and locations of Base Stations to be deployed in the specified area. When a Base Station covers a large area and the meter module density or air message frequency requirements continuously increase, at some stage the farthest meter modules would endure interference from the closer meter modules, and message reception probability from the farthest meter modules will decrease. Base Stations may be added at appropriate locations in the same geographic area, in order to increase network capacity and message reception rate. Adding Base Stations reduces the effective range between each meter module to be deployed and the Base Station closest to it, so that more meter modules or potential meter module locations are within a range of high air-message reception probability. Thus, the placement of additional Base Stations in the same geographic area, without any other change in the network or the meter modules, will in itself increase overall network capacity.

Level 3: Frequency diversity is implemented by utilizing more than one uplink frequency channel within a coverage area. Meter modules may be programmed to alter their transmission frequency channel each air message transmission. In addition, a Base Station may consist of several receivers in multiple frequency channels, thus significantly increasing the Base Station's air message reception capacity. Frequency diversity may thus eliminate or postpone coverage problems, which would otherwise require adding Base Station sites. In addition, frequency diversity may be combined with space diversity by feeding receivers operating in different uplink frequency channels at the same Base Stations with signals from separate antennas. In the 902–928 MHz unlicensed ISM band, a particular embodiment of the network may operate in up to 57 channels, spaced 400 kHz apart, but a more practical limit for reliable operation would be about 10 channels. Each new frequency channel receiver added, increases the Base Station's capacity. When performed on a regional Base Station network, adding channels significantly increases the entire network's capacity.

Level 4: Another network control parameter included in the preferred embodiment consists of the direct sequence code length, which forms a trade-off with the air message's raw data bit rate parameter. In a particular embodiment, the direct sequence chip rate is 1 Mchips/sec and the maximum code length is 255 chips, yielding a data rate of about 4 kbps. The network operator/planner may select shorter codes, namely 63, 31 or 15 chips long, thus increasing the raw data bit rate. Reducing code length reduces the signal spreading and decreases coverage range per Base Station, but on the other hand increases each Base Station's air message capacity because of the shortened air messages.

Network Up-scaling by Adding a Downlink Channel

Level 5 (highest level of air-message capacity): In a one-way data collection network, an additional, higher level of capacity may be reached by adding a downlink channel and deploying transceivers rather than transmitter meter modules. A two-way system has the inherent potential to be more efficient with radio airtime resource, since field units may be synchronized to a central clock, allowing transmission according to allocated time slots. The higher the rate of two-way meter modules in the metered population, the higher the capacity increase provided by adding the downlink channel. The wireless data collection network described above may be scaled up from one-way (data collection only) to two-way by connecting the DOC to a wireless downlink channel in a modular way as described above. In addition, the measures described in levels 2 to 4 above may be implemented in a two-way network as well in order to further increase network capacity.

Integrating a downlink channel consists a cost-efficient scaling-up procedure, which provides significant enhancement of both network air message capacity and metering data application functionality. This enhancement does not require the network operator to perform any changes in any of the already existing elements of the network infrastructure.

In a preferred embodiment of a two-way metering data network, both one-way (transmitter) and two-way (transceiver) meter modules operate on the same network. Transceivers can be interrogated for data at the time that the data is required, thus eliminating the need for repeated transmissions, which are required in a one-way network in order to maintain a certain level of data latency. In addition, by synchronizing all transceiver modules to one central real-time clock, a time slot for transmission may be allocated and specified for each transceiver in a coverage area, thereby increasing the efficiency of network airtime usage.

Although several advanced metering applications, such as demand and TOU metering, are available from a one-way metering data collection network, two-way meter modules operating in the described two-way metering data network are capable of providing additional features, including: accurate interval consumption data measurement enabled by a regularly synchronized real-time clock, on-demand meter reading, remote disconnect and reconnect, remote programming of meter parameters and remote notification of rate changes or other messages.

The particular embodiment of the described two-way data network enables the operator to mix on the same network, in a cost efficient manner, low cost transmitters, which provide a wide range of metering data collection features, and higher cost transceivers, which further enhance metering data application features, while maintaining the core advantages of sparse infrastructure and the low cost associated with unlicensed operation of the metering data collection branch of the network.

Network Application Scalability

In addition to the scalability and flexibility provided by the levels of network architecture described previously, there is another key feature of the system claimed herein, referred to as "Application Scalability", which includes a cost-efficient method of enhancing the metering applications supported on the network from basic (typically daily) meter reading services to interval-consumption related applications, such as demand analysis, load profiling and TOU rates, and further to two-way data features. As described, some application features, including on-demand meter reading, remote disconnect and reconnect, remote programming of meter parameters and remote notification of rate changes or other messages, require that the network architecture be scaled up to a two-way network by adding a downlink channel. However, applications based on interval consumption data can operate successfully on a one-way network and, by using the method described herein, a relatively minor increment in air message traffic is incurred.

In prior art, extensive infrastructure is deployed in order to collect interval consumption data frequently (e.g. every 15 minutes). However, in many cases, particularly in residential metering applications, consumption data may be required in high resolution, but some latency is permitted in data availability. For example, fifteen-minute demand analysis could be required, but may be performed each morning on data collected the previous night, allowing several hours in order to collect the required interval consumption data. It would therefore be beneficial for the network service provider to have the flexibility to deploy infrastructure appropriate to the application and invest in additional infrastructure for high-end applications, such as on-demand reads, only in proportion to the meter population for which it is required.

In a particular embodiment, an interval consumption data message includes an array of interval consumption values, each one representing the consumption increment of one interval. In order to reduce the total length of air messages, or the total number of fixed-length interval data air messages, a method referred to as "logarithmic table encoding" of consumption values is used, which encodes interval consumption data in the air message. It is a method to map the range of consumption values into a more limited number of values, for the purpose of reducing the number of bits of information transmitted over the air. This mapping is executed by a series of tables, which have been predefined by the customer, according to the expected dynamic range of the interval consumption.

Figure 9A:
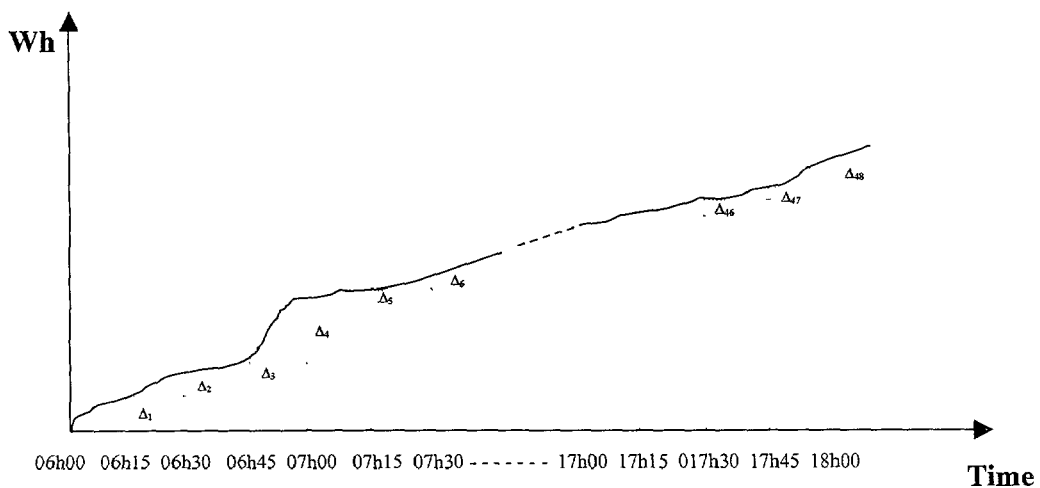
FIG. 9 is a graphic illustration of interval consumption data required to be transmitter in an air message.
Figure 9B:
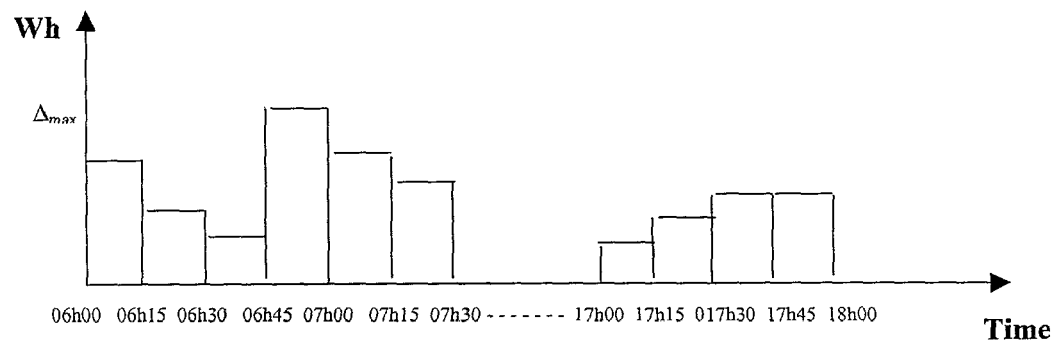
Figure 11A:
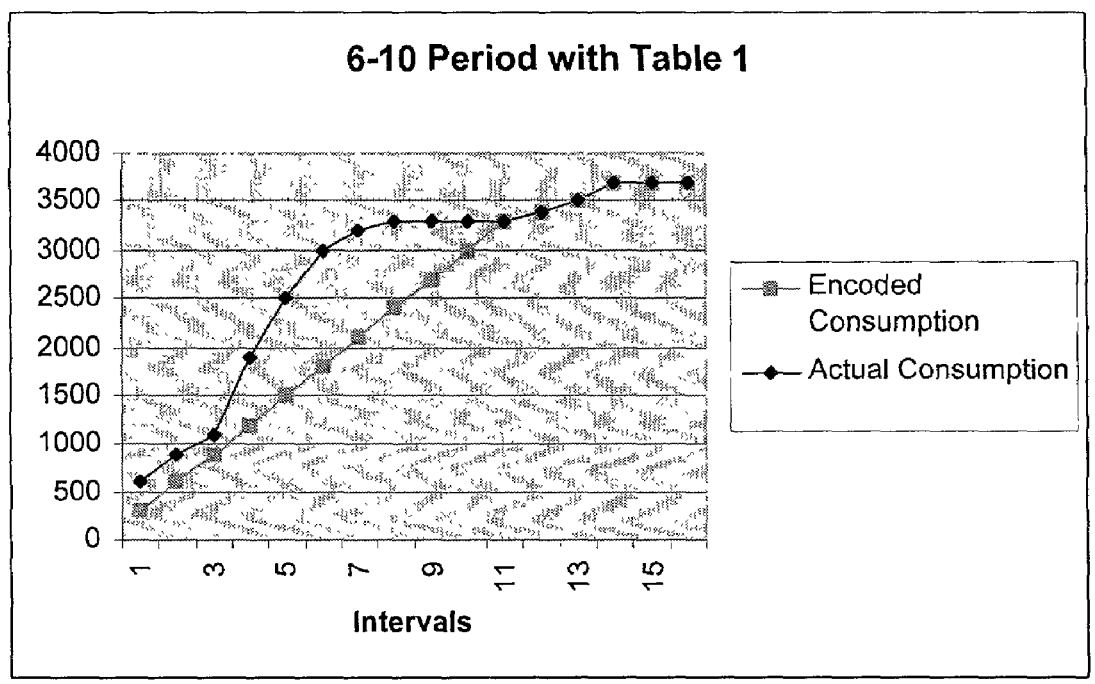
FIG. 11 demonstrates the evaluation process by which the meter module determines which consumption data-encoding table to select.
Figure 11B:
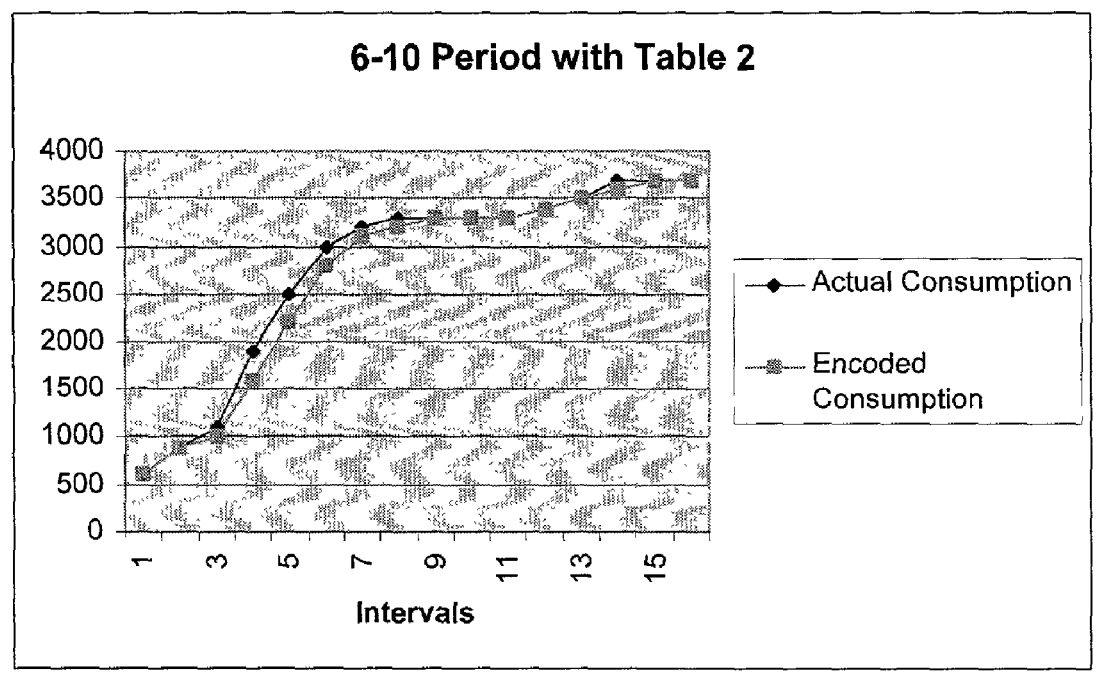
Figure 11C:
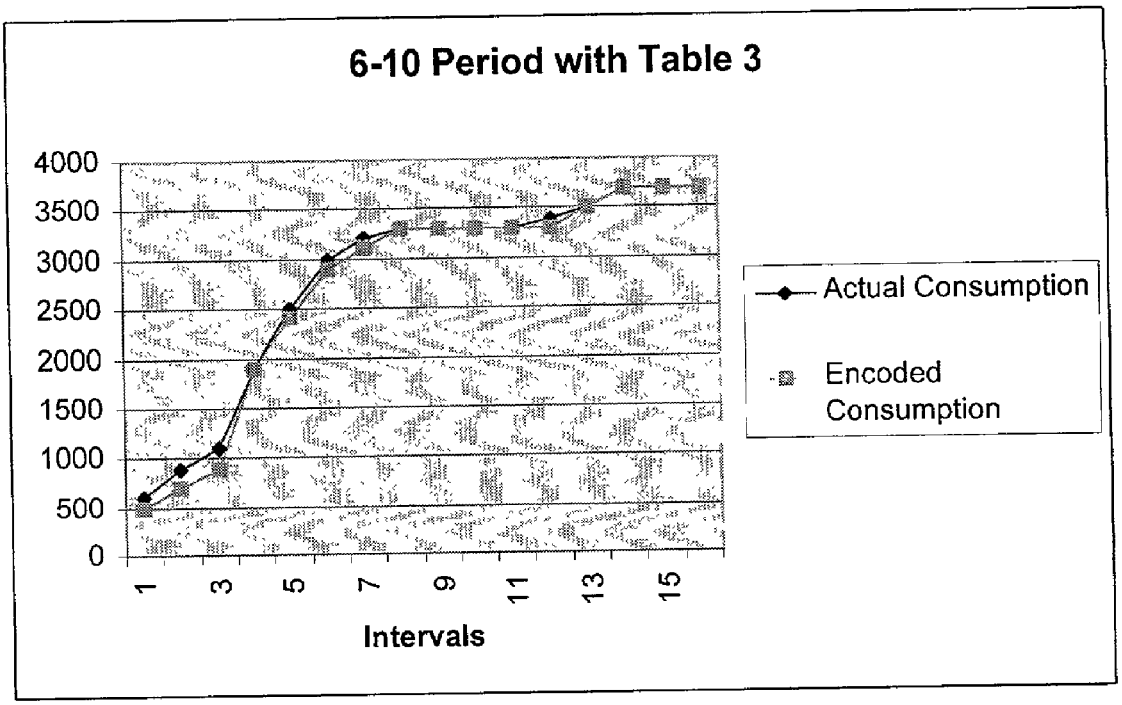
Figure 11D:
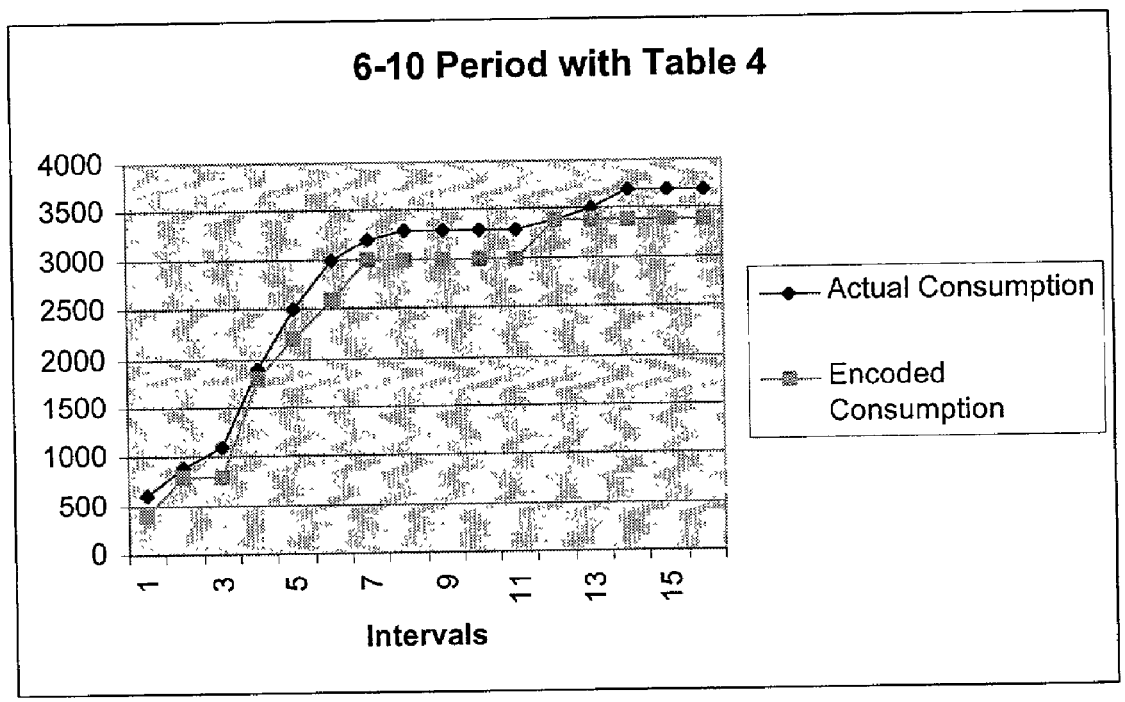

FIG. 9 shows an example of interval consumption data that may be required by a demand analysis application. In this example, it is assumed that an accuracy of 0.1 kWh is sufficient. Also by way of example, a 12 hour total time period is measured for 15 minute consumption data. In order to optimize the consumption profile reconstructed, the total time period may be divided to several sub-periods, in this example 3 periods of 4 hours. The flexibility of assigning different encoding tables to different sub-periods reduces the statistical error of the decoded consumption profile compared to the actual one.

The numeric consumption values given in FIG. 9 would traditionally require an encoding table with values ranging from zero to 1800 Wh, in 100 Wh increments, i.e. 19 values, requiring 5 bits per each consumption interval to encode. In order to reduce the overall air message traffic associated with interval consumption data applications, only 2 bits are used in this example for interval consumption encoding. This approximation inevitably creates an error in the reconstruction of a consumption profile compared to the actual consumption, but with appropriate definition of a set of encoding tables for the meter module to use, an acceptable error level may be reached.

The set of tables assigned to a meter module may differ from one meter module to another according to the expected consumption patterns. The DOC maintains a bank of available tables from which a set of tables is defined for each meter module during installation. An example of such a set of encoding tables is shown in FIG. 10.

An interval consumption air message in the provided example would therefore contain 2 bit interval data for 48 intervals of 15 minutes, i.e. 96 bits, plus two bits identifying the table chosen per each period, to a total of 102 bits, compared to 19 bits×48 intervals, or 912 bits, in a traditional system with no logarithmic encoding.

The meter module selects an encoding table by building a consumption profile with each of the tables stored in its memory, and comparing it to the actual profile, stored in its memory as a series of actual reading values. Then the meter module applies a criterion by which to select the best table, e.g. the table that yields the lowest maximum error during the metered period, or the lowest variance between the encoded and actual profile.

The encoded consumption profile is built in the following process: if during an interval, actual (aggregated) consumption reached a value X, the interval consumption value, which would bring the encoded consumption profile to the closest value less or equal X, and which is also represented by a two-bit code in the encoding table, is used in order to build the encoded consumption profile. An example illustration of the profiles constructed vs the actual consumption is shown in FIG. 11. In the example, if a minimum error criterion is applied for the 6–10 four-hour period shown, then Table 3 would be chosen, as it yields a maximum error of 200 Wh (0.2 kWh) during the period. A table is selected for the other two periods in the example (10–14, 14–18) in an identical process. A reverse process is applied at the DOC in order to extract the interval consumption data, in which the table set used by the meter module is retrieved and then the consumption profile is reconstructed for each sub-period.

Figure 7:
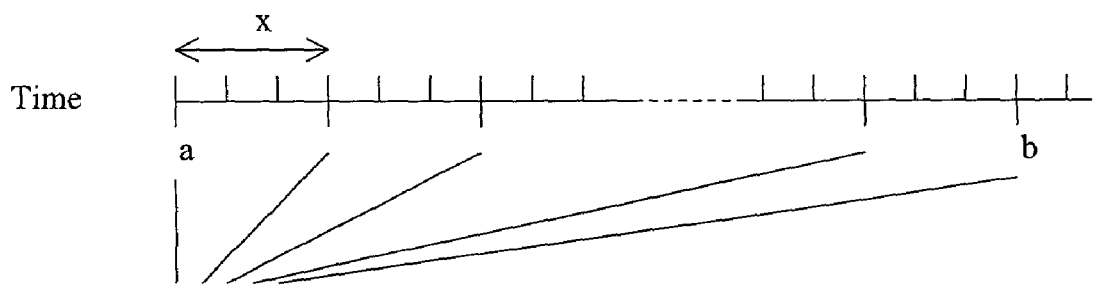
FIG. 7 is a description of the interleaving encoding, which is used by the meter module in order to generate interval consumption data air messages.
Figure 7:
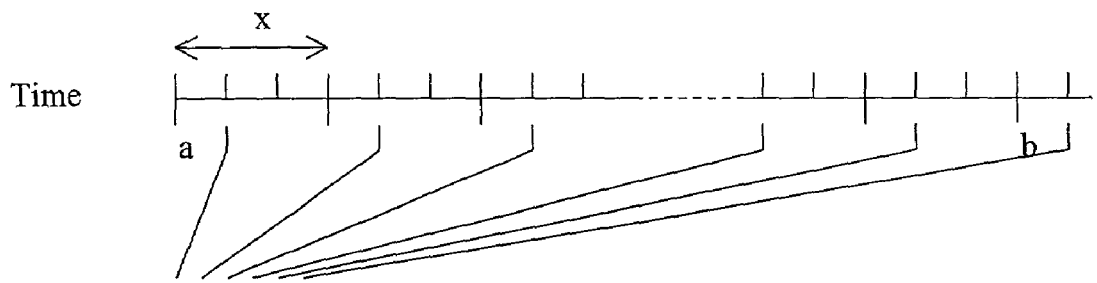
Figure 7:
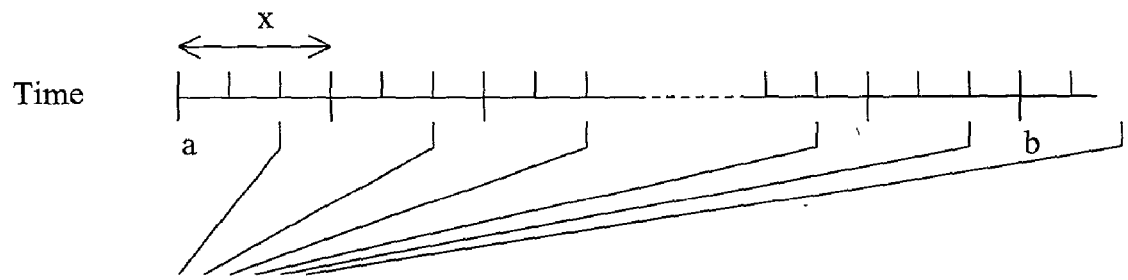

In order to provide a high level of redundancy of interval consumption data, another data encoding method is provided, referred to as interval consumption data "interleaving air message encoding", which splits interval consumption values between separate messages. In a particular embodiment, depicted graphically in FIG. 7, three separate interval consumption data air messages are transmitted that relate to the same consumption period b-a. The first air message includes samples taken at times a, a+x, a+2x, ... b. The second air message includes samples taken at times a+x/3, a+4x/3, a+7x/3, ... b+x/3. The third air message includes samples taken at times a+2x/3, a+5x/3, a+8x/3, ... b+2x/3. Two bits identifying the reference time are appended to the interval consumption data air message described above (to a total of 104), enabling the DOC to correctly correlate different interval consumption air messages received from the same meter module.

Interval consumption data is defined to have a resolution value corresponding to the size of the time interval between consecutive consumption values sampled. If a message is lost, interval consumption data is still available at the DOC with a resolution of x or better. If no messages are lost, interval data is provided at the DOC with a resolution of x/3. This way, the meter module maintains the potential to provide high resolution interval consumption data, but also provides lower resolution interval consumption data with a higher redundancy level than that available when data is not split as described above.

By combining the two encoding methods described, a highly reliable and efficient interval consumption data collection system is provided. In the example of FIG. 9, 8 daily messages (typical length about 100 bits) are required to deliver interval data, with a redundancy level of 3, whereas without using the provided methods, at least 14 daily messages would be required to achieve the same redundancy level. The encoding methods provided therefore maintain high channel reliability while increasing network capacity, by 75% in this example.

The system supports interval consumption data applications even when a power outage occurs. This is performed by appropriate utilization of the meter module non-volatile memory, and without requiring any backup battery. Following is described a method, combined with the methods described above for data encoding, for retrieving interval consumption data in a one-way data collection network, after an outage event has occurred.

The meter module periodically and frequently executes a procedure, which updates and stores an interval consumption data message. The purpose of this process is to prevent from losing interval consumption data upon an outage event.

A general distinction exists in the system between a regular metering data air message, referred to as "full data message", and an interval consumption data air message, which includes only a series of consumption data values, as sampled by the meter module. Upon power restoration after outage, the meter module transmits a full data message, also including a flag signifying that power has just been restored. In parallel, a new interval consumption data cycle (period) begins as the module's microcontroller wakes up. Shortly thereafter, the last saved interval consumption data air message is transmitted. The meter module maintains an internal flag called 'first interval consumption message transmitted'. Only once this flag is set, can the procedure that updates and stores an interval consumption data message operate. The flag is reset upon power restoration, and set once the last saved interval consumption message is transmitted. The DOC identifies the power restoration message and thus identifies the interval consumption message that follows it as the last saved interval consumption message to follow, enabling the DOC to reconstruct interval consumption data prior to the outage event. In addition, the next scheduled full data message, following the power restoration message, is also flagged by the meter module as the 'second full data message since power restored'. This acts as a redundant measure to identify the last saved interval consumption message before the outage event.

Meter Module

Following is a description of the meter module apparatus used in the network system. The meter module described has unique features of low overall power consumption, high output power and low cost overall design, enabling long battery life and long communication range in a commercially feasible fixed wireless network for a variety of metering applications.

Figure 3:
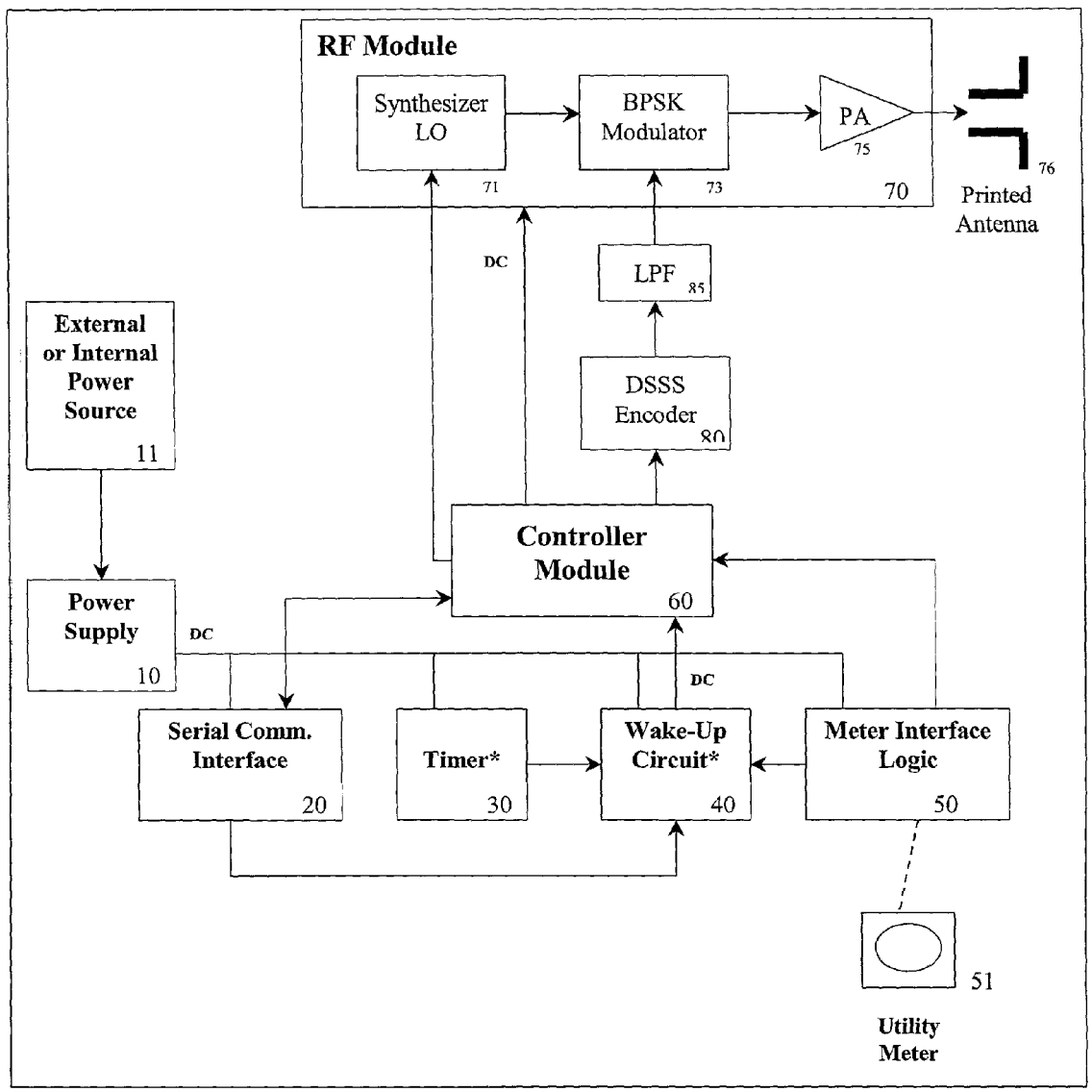
FIG. 3 is a block diagram of a transmitter meter module.

Each meter module in the network continuously monitors the resource consumption according to an input sensor that is coupled to the utility meter. In a particular embodiment, the meter module may be integrated inside, or as a part of, the meter enclosure. The meter module stores and transmits a wide array of data fields related to the meter, including consumption data, meter identification and calculation factor data, and various status alerts. Meter reading is stored as an aggregated value and not as an increment value, thus maintaining the reading value's integrity if an air message is not received at the DOC. A one-way meter module transmits a metering data air message once every preprogrammed time interval. A block diagram of the transmitter is depicted in FIG. 3 according to a particular embodiment of the present invention. In this particular implementation, the transmitter includes a meter interface logic module 50 that collects consumption, tamper status and other data from an associated utility meter 51. It should be noted that, although FIG. 3 depicts a single meter interface module for purposes of simplification, multiple meter interface logic modules may be used in a single transmitter to interface with more than one utility meter. The meter interface logic module 51 operates continuously and draws only a small amount of current. It includes several standard sensors, such as magnetic reed switches or optical sensors in order to track consumption, tilt sensors for tamper detection and voltage sensors to determine outage or power restoration events.

The transmitter includes a serial data communication interface 20, which is used for testing and initialization at the shop or in the field by using a short-range wireless magnetic loop interface or a PC with a serial data port. The wake-up circuit 40 is designed in order to save power, particularly in battery operated transmitters, by keeping the controller 60, RF module 70, DSSS encoder 80 and LPF 85 in a turned off (no power) state, which is interrupted only if an event was triggered by the meter via the meter interface logic 50, by an external device via the serial data interface 20, or by the timer completing its timing cycle and triggering a wake-up signal. In another embodiment, particularly with an unlimited power source as may be the case with electric meters, the controller operates continuously and also maintains a timer, and a wake-up circuit is not used.

If an event occurred which is determined by the controller 60 to trigger air message transmission, the controller module 60 prepares a data packet, which is converted to a direct sequence (PN code generation and signal spreading) by the DSSS encoder 80. The spread signal is filtered by a low pass filter (LPF) 85 and is the used as the modulating signal for the BPSK modulator. The RF module 70 includes a synthesizer controlled local oscillator (LO) 71, a Binary-Phase-Shift-Keying (BPSK) modulator 73 and a power amplifier (PA) 75. The power amplifier 75 produces up to 1 W of power for output to an on-board printed antenna 76. Once the controller has handled the event that woke it up from its power-down mode, whether an air message transmission or other task was performed, it returns to its power-down (idle) mode.

Restrained Power Supply

In a particular embodiment of the meter module, a restrained power supply 10 is implemented in the meter module, which is essential in order to maintain an acceptable level of radio interference in the event of uncontrolled transmission by a malfunctioning meter module. One source of danger in the system is the possibility that a transmitter will malfunction and begin transmitting continuously. The result may be that the entire frequency channel would be blocked in that coverage area during the time of transmission, until the transmitter's power source dies (and this would continue indefinitely if the power source is unlimited, such as an electric grid). Although this event is highly unlikely, measures have been designed into the system to prevent it from happening. In the meter module described herein, a cost effective mechanism has been introduced to prevent an uncontrolled transmission from blocking network air message traffic. This mechanism provides two additional benefits to the system: high output power with a limited power source and an immediate outage notification feature, also known as a 'last gasp' transmission.

The meter module's power supply hardware is designed to prevent the described phenomenon of continuous uncontrolled transmission. Two specific physical limits have been designed into the meter module to meet this purpose. A capacitive element and a limited current source are combined in the meter module's power supply. The capacitive element is used as a buffer stage between the energy source and the load. The capacitive element stores sufficient energy, as required for a high-power air message transmission. Due to its inherent physical limitations, the capacitive element can deliver sufficient power for transmission but only for a limited period of time. Since the duration of transmission is relative to the element's physical capacitance, and physical capacitance is related to the size of the element, the size of the capacitive element is selected to be big enough to deliver enough energy for a complete transmission session, but not more than that. This way, the maximum potential blockage duration due to unwanted transmission is restricted to one transmission session. In addition, the limited current source imposes a physical limitation on the recharge time required for the capacitive element to reach the required energy level for another air message transmission, thus limiting the on-off transmission duty cycle to a level that is harmless in terms of network capacity. In a particular embodiment, the transmitted power is one watt, for a duration of 150 msec and with a recharge time of 90 seconds. This translates to a maximum of 960 messages per day, which is about 1% of an estimated channel capacity of 86,400 messages per day. Since network coverage is designed with a much higher safety margin than 1%, a malfunctioning transmitter would not be destructive to the network operation, allowing sufficient time for software means to detect and identify the source of the problem.

The described power supply therefore also enables the transmitter to generate high-power air message transmissions, even with a power source that supports a very low current drain. It also enables an enhancement of electric metering applications by enabling a 'last gasp' metering data air message transmission when an outage event is detected by an electric meter module.

Low Power Rotation Sensor Circuit

In a particular embodiment of the meter module, appropriate circuitry and controller logic enable near zero power consumption of the rotation sensing mechanism, which is a part of the meter interface logic 50. This may be a decisive factor in the expected operating life of a meter module powered by a limited power source such as a battery.

Figure 8A:
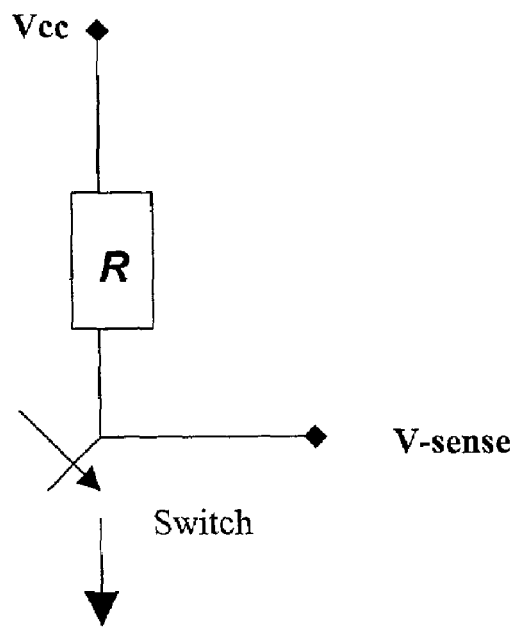
FIG. 8 is a description of the 'zero current' rotation sensor interface logic.

A typical prior art sensor configuration appears in FIG. 8A. The switch has two operation states, open and closed. When the switch is open the current circuit is broken and the voltage measured at the V-sense node equals the supply voltage Vcc. When the switch is closed the voltage measured at V-sense node is the circuit's ground level reference voltage i.e. zero voltage. Distinguishing between the two electrical states at the V-sense node allows distinguishing between the two switch states open and closed.

Although most switches have finite conductivity, typical power consumption in the open state is acceptable for long operating life. However, during the closed state, power is consumed at a level that may be significant when the energy source is limited as in battery-powered devices, and when that limited source must operate for lengthy periods of time, such as is the case with meter modules. In addition, the amount of energy wasted typically cannot be predicted, and may vary widely with utility customer consumption patterns.

An alternative to the standard sensor configuration may be referred to as "Zero Current Sensors Configuration". The implementation is based upon a component selection and geometrical arrangement of two sensors, such that at any possible position of the sensed rotating element, such as a magnet or a light reflector, only one of the two sensors may be triggering a closed switch state.

Figure 8B:
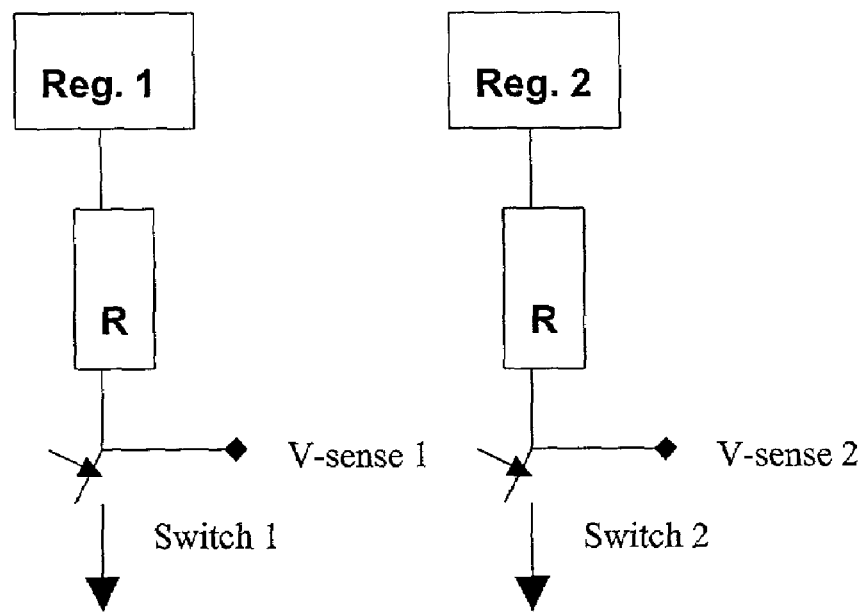

FIG. 8B illustrates the solution. The two switch circuits are activated or deactivated by control commands of the controller 60. Loading high state voltage into a register causes the activation of the associated switch. Loading low state voltage into a register causes deactivation of a switch. When a switch is deactivated, no current can flow via the switch, even when the switch state is close and of course, no current flows when the switch is open. The result is that no current flows, and hence no energy is wasted, when the switch is open, or if the switch is de-activated without regard to the state of the switch.

The controller module 60 is programmed to deactivate a sensor circuit immediately once that sensor has been detected in a closed switch state. In addition, the controller module activates the other sensor circuit. For example, if the initial state was that Switch 1 is activated and Switch 1 is projected by the projection element (magnet/reflector), it changes its state from open to close, the voltage at V-sense 1 is changed from high state voltage to zero. The voltage drop wakes up the controller module 60, which then deactivates Switch 1 and activates Switch 2. Since Switch 2 is located in different projection zone than Switch 1, Switch 2's state when activated is open so no current flows via Switch 2. Since Switch 1 is now de-activated, no current flows via Switch 1 either. When the rotation of disk or wheel continues and the projection element reaches the projection zone of Switch 2, Switch 2 changes its state from open to close, the V-sense 2 is changed from high state voltage to zero, the controller unit 60 is woken up, and the controller unit 60 then immediately deactivates Switch 2 and activates Switch 1. One rotation of the disk or wheel is defined as state change of Switch 1 from open to close followed by state change of Switch 2 from open to close, after which the controller increments the meter revolution count. However, neither switch is ever active and closed. Therefore the continuous current drain of the sensor circuitry only includes that of the open switch, which is near zero.

Low Cost RF Modulator

Figure 4:
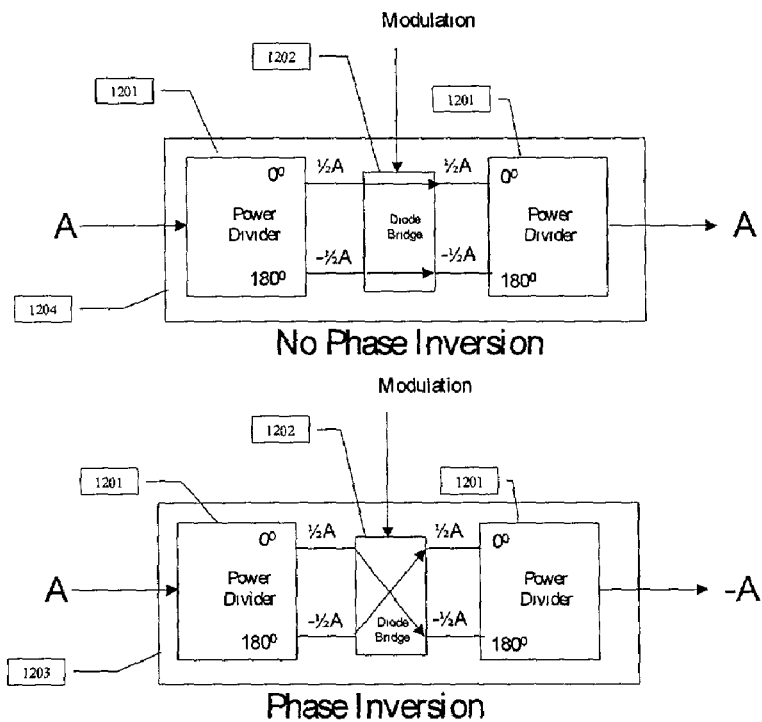
FIG. 4 is a functional block diagram of the BPSK modulator described in FIG. 3.

FIG. 4 is a block diagram depicting an example arrangement for implementing the BPSK modulator 73 of FIG. 3. Unlike conventional microwave monolithic integrated circuit (MMIC) BPSK modulators, which are large and expensive, the arrangement illustrated in FIG. 4 is compact and can be implemented at a low cost. The BPSK modulator of the present invention includes a diode bridge 1202 that can be switched to provide either an in-phase output signal (upper configuration of FIG. 4) or an inverted-phase output signal (lower configuration of FIG. 4). Balun (balance/unbalance) circuits 1201, implemented as 180° power dividers, are used at the inputs and outputs of the diode bridge 1202. The balun circuit 1201 at the input of the diode bridge 1202 feeds the cross switch implemented by the diode bridge 1202, and the balun circuit 1201 at the output of the diode bridge 1202 sums the energy either in phase or in inverted phase. The balun circuits 1201 are implemented using an FR4-type printed circuit board (PCB), avoiding the need for tuning during production. The PCB has four layers, the inner two of which are used to implement the balun circuits 1201. Each balun circuit 1201 includes three broadside coupled transmission line pairs.

Figure 5:
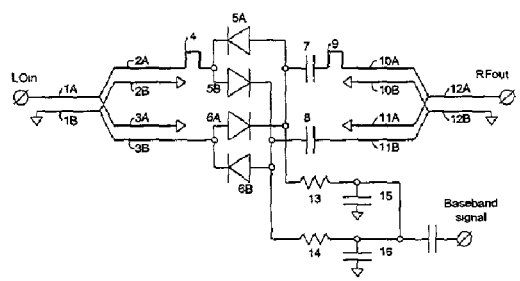
FIG. 5 is a block diagram and illustration of the BPSK modulator of FIG. 4.
Figure 5:
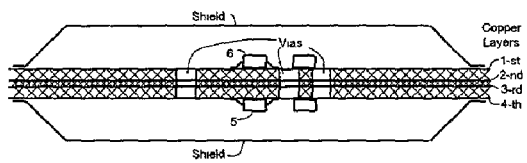

FIG. 5 is a schematic diagram illustrating the arrangement of FIG. 4 in greater detail. Diodes 5A, 5B, 6A and 6B form the diode bridge 1202. An input balun 1201 is formed by three pairs of coupled transmission lines, namely, transmis sion lines 1A and 1B, transmission lines 2A and 2B, and transmission lines 3A and 3B. Similarly, an output balun 1201 is also formed by three pairs of coupled transmission lines: transmission lines 10A and 10B, transmission lines 11A and 11B, and transmission lines 12A and 12B. The input balun 1201 feeds the diode pair formed by diodes 5A and 5B and the diode pair formed by diodes 6A and 6B with antipodal signals that are approximately 180° apart in phase. The modulation provided through the baseband signal bi-phase modulates each branch. The output balun 1201 sums the two branches. Small transmission lines 4 and 9 provide small corrections to ensure that the two branches are 180° apart in phase.

Figure 6:
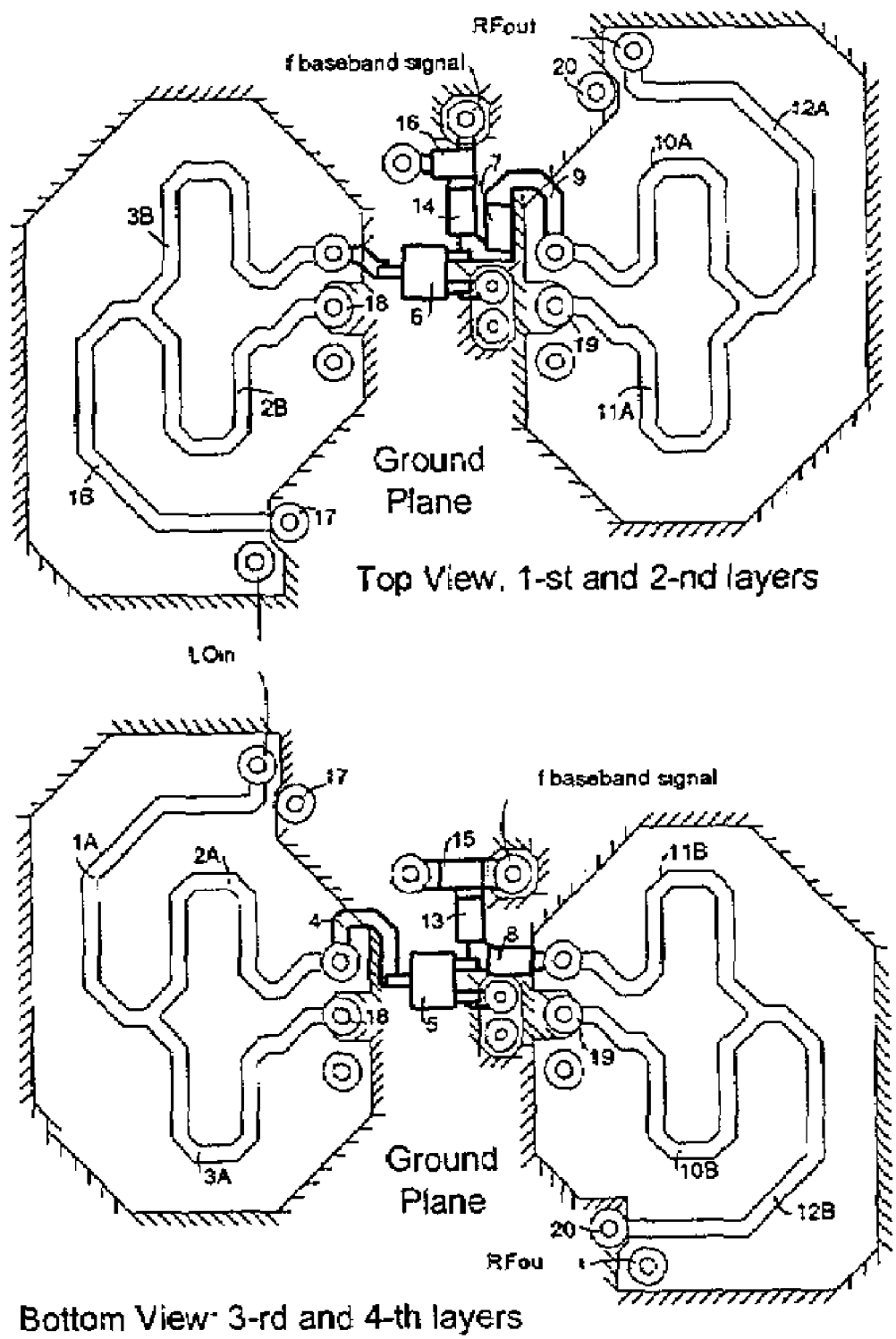
FIG. 6 is a top and bottom drawing of the BPSK modulator of FIG. 4.

FIG. 6 is a cross-sectional diagram depicting an example physical implementation of the arrangement of FIG. 5. The modulator is implemented using a PCB made of FR4-type material. The PCB has four layers and is surrounded by a shield. For 1 MHz modulation, the modulator measures 15 mm by 23 mm and has a bandwidth of 750–1500 MHz. Half octave phase accuracy is within 1°, and full octave phase accuracy is within 2.5°. Amplitude imbalance is preferably less than 0.2 dB, and signal loss is preferably less than 6 dB. Carrier suppression is preferably at least 17 dB.

What is claimed is:

1. A low cost Binary Phase Shift Keying (BPSK) RF signal modulator, implemented on a four-layer PCB, providing high performance at a very low cost compared to microwave monolithic integrated circuit (MMIC) BPSK modulators, said modulator having means switched to provide one of: an in-phase output signal, and an inverted-phase output signal and power dividing means at the input and output of said means switched to provide one of: an in-phase output signal, and an inverted-phase output signal.

2. The low-cost Binary Phase Shift Keying (BPSK) RF signal modulator of claim 1, wherein said means switched to provide one of: an in-phase output signal, and an inverted-phase output signal comprises a diode bridge, and said power dividing means each comprise a balance/unbalance circuit.

* * * * *